Sept. 21, 1965     W. C. SPINDLER     3,207,149

CHEMOELECTRIC HEAT SOURCE

Filed July 23, 1962

WILLIAM C. SPINDLER
*INVENTOR.*

BY *J. M. St. Amand*

*ATTORNEY*

United States Patent Office 3,207,149
Patented Sept. 21, 1965

3,207,149
CHEMOELECTRIC HEAT SOURCE
William C. Spindler, Arlington, Calif., assignor to the United States of America as represented by the Secretary of the Navy
Filed July 23, 1962, Ser. No. 211,920
9 Claims. (Cl. 126—263)
(Granted under Title 35, U.S. Code (1952), sec. 266)

The invention herein described may be manufactured and used by or for the Government of the United States of America for governmental purposes without the payment of any royalties thereon or therefor.

The present invention relates to electrochemical batteries and more particularly to a chemoelectric heat source.

The purpose of the invention is to more effectively transfer power from an electrical generator to a load, by establishing a new concept of heat generation from the conversion of chemical to electrical to thermal energy. It is the efficiency of rate of transfer of electrical energy, and not the efficiency of total energy transfer, that is to be improved.

The old method of heat generation depended on the flow of electrons out of a generator and into an external load device. A typical generator discharging into an external load device would be an electrochemical battery connected across an ohmic load in a series loop. The heat generated in the load is expressed by the formula $$Q_{\text{Load}} = \frac{E_G{}^2 R_L t}{(R_G + R_L)^2}$$

where $E_G$=battery voltage, $R_G$=battery internal resistance, $R_L$=load resistance, and $t$=battery discharge time.

The rate of generating heat in the load is the principal variable of concern, and not the total quantity of heat generated;

$$\frac{dQ_L}{dt} = \frac{E_G{}^2 R_L}{(R_G + R_L)^2} = P_L = \text{Power}$$

It can be shown that maximum power is transferred to the load when $R_L = R_G$, which yields $$P_L = \frac{E_G{}^2}{4 R_G}$$

It can also be shown that when the battery is short-circuited $R_L = 0$ and power is generated exclusively within the battery, the total power, $P_T$, developed is given by $$P_T = \frac{E_G{}^2}{R_G}$$

A comparison of the two power equations shows a 25% theoretical limit on the amount of power which can be transferred to an external ohmic load, based on the maximum power which can be generated by the source. This limit applies to all linear, ohmic circuits. The limit may be substantially lower for batteries characterized by additional non-ohmic polarization, such as hydrogen overvoltage.

The present invention for heat generation is based upon eliminating the external load resistance, and combining the load and generator into one unit. Thus whatever heat is generated may be utilized; there is no division of heat between two or more elements in the electrical circuit. In essence, this new device converts chemical energy to heat energy, with an intermediate step involving electrical energy.

It is an object of the invention, therefore, to provide a novel means of heat generation from the conversion of chemical to electrical to thermal energy.

It is another object of the invention to provide a means for greater efficiency of rate of transfer of electrical energy for the purpose of heat generation.

A further object of the invention is to provide a new means for generating heat by use of a combined load and generator cell, and eliminating external load resistance.

Other objects and many of the attendant advantages of this invention will become readily appreciated as the same becomes better understood by reference to the following detailed description when considered in connection with the accompanying drawings wherein.

Figure 1:
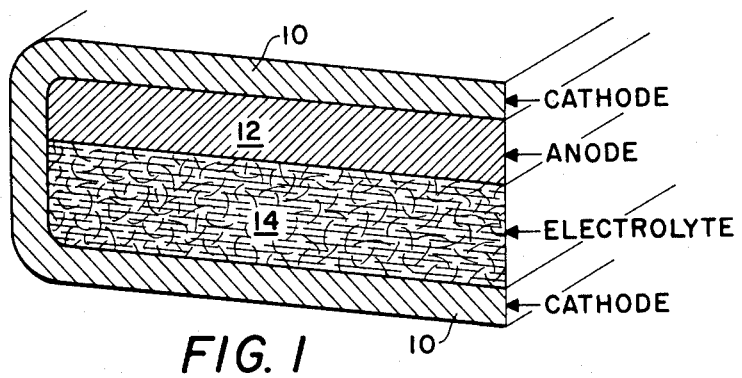
FIG. 1 is a cross-section of a cell of the present invention showing a short-circuited cell wherein the cathode is folded back around into contact with the anode.
Figure 2:
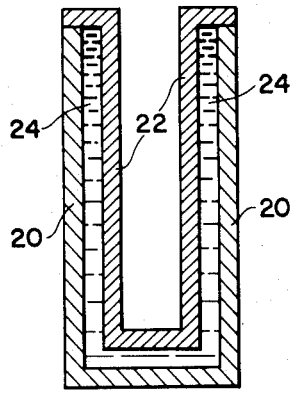
FIG. 2 shows another embodiment of the invention wherein a box of bimetal is separated by electrolyte between the two layers of metal.
Figure 3:
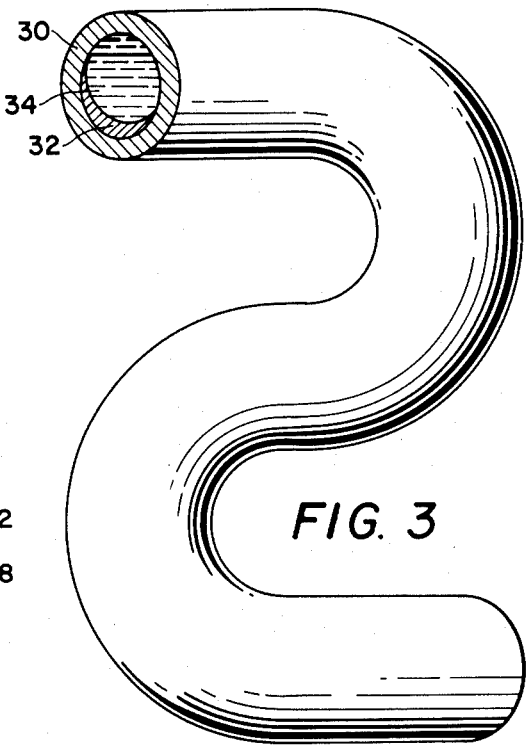
FIG. 3 shows a bimetal tube enclosing an electrolyte as a heat generator.
Figure 4:
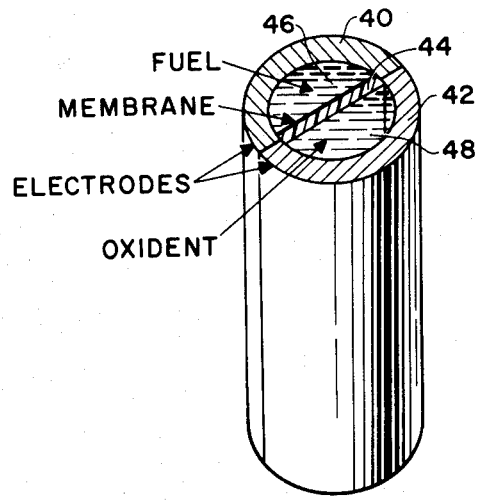
FIG. 4 is another embodiment of a heat generator showing a bimetal tube having a membrane separating a fuel from an oxidant.

The basic principle of construction of my heat generating electrochemical cell requires the electrodes to be short-circuited at some point within the total structure, as illustrated in the drawings. A cell will be operational as soon as it is assembled with a complete array of active parts. One part of the cell can be withheld until operation is desired. Usually it will be most convenient to keep a liquid component separate; for example, the electrolyte. An elementary construction of a short-circuited cell is the slab type resembling that shown in FIG. 1. The cross-sectional view shows the folded cathode metal 10 enclosing the other two main components of an electrochemical cell, the anode 12 and electrolyte 14. To allow delayed activation, the electrolyte layer 14 could consist of an inert separator which would absorb or become active in the presence of an electrolyte whenever it is introduced into the cell. In heat generating cells, such as shown in FIGS. 2-4, where absorbent separators are not used, electrolyte could be withdrawn before the electrodes were exhausted, permitting additional, later use. However, even where an inert separator is used, electrolyte solvents having a high vapor pressure can easily be removed by evacuation, and any residue of electrolyte salts when dry would be non-conductive.

Upon activation, each electrode develops a potential which depends on the choice of cell components. A current will flow through the cell due to the chemical reactions at each electrode. At the cathode, reduction of one chemical species consumes electrons which enter the cathode metal from the anode where oxidation of another chemical species produces electrons. An ionic current flows through the electrolyte to complete the electric circuit. Heat is generated in the cell by several processes. Fundamentally, the heat of reaction of the chemical components ($\Delta H$) appears as a change in free energy ($\Delta F$) plus an entropy change, according to the equation:

$$\Delta H = \Delta F + T \Delta S$$

where $T$=absolute temperature of the chemical reaction and $\Delta S$ is the entropy change. The free energy, $\Delta F$, includes all electrical work that is performed. In this new type of cell, the electrical work appears as ohmic heating due to passage of current through the various cell resistances. The largest component of resistance will usually be the electrolyte, but the electrodes and the electrode-electrolyte interfaces also contribute resistance. The electronic current through the metals will encounter negligible resistance. Nonohmic polarization of the electrodes will contribute additional heating in the cell, which is added to the entropy change in the chemical reaction.

The correspondence between energy and power relations with the thermodynamic quantities expressed above may be concisely stated by rewriting the free energy in terms of cell voltage. Total heat of chemical reaction ($\Delta H$) is then given by:

$$\Delta H = nf(E_{rev} - E_{cell}) + T\Delta S$$

where $n$ = number of faradays in the chemical reaction
$f$ = faraday constant
$E_{rev}$ = the reversible potential of the cell
$E_{cell}$ = voltage of cell during discharge Case 1:
  $E_{cell} = E_{rev}$ (external circuit resistance is infinite)
  $\Delta H = T\Delta S$
  Theoretical energy efficiency = 100% (if $T\Delta S = 0$)
  Theoretical power efficiency = 0%

Case 2:
  $E_{cell} = 0$ (external circuit resistance is zero)
  $\Delta H = nfE_{rev} + T\Delta S$ (all chemical energy appears inside cell as heat)
  Theoretical energy efficiency = 100%
  Theoretical power efficiency = 100%

The definitions of efficiency are based on ratios of quantities obtained to quantities available. In case 1, an infinitesimally small current flowing for an infinitely long time will permit all the electrical energy to be transferred to the external circuit. Since the rate of transfer of energy is zero, power efficiency is zero. In case 2, all energy appears internally as heat, yielding 100% energy efficiency. Also, since rate of conversion of chemical energy to electrical energy is a maximum, power efficiency is 100%.

Referring again to methods of activation and possibility of control of discharge process, it was stated that removal of electrolyte would halt the cell reaction. If activation were accomplished by the introduction of a vapor; e.g., a solvent such as $H_2O$ or $NH_3$ which would react with an inert salt between the cell electrodes to form an active electrolye; then it would be possible to control the rate of reaction by controlling rate of entry of solvent vapor. Additionally, removal of solvent by evacuation would be a convenient means of shutting off the cell reaction. Depletion of active cell materials could conceivably be prevented by suitable arrangements to feed reactants into place as required, and/or continuously supply electrolyte which could remove reaction products in its flow path.

It should be apparent that the rate of reaction in a short-circuited cell will be much faster than could be employed practically in a conventional electronic circuit. The requirement that electric power be transferred from generator to load by means of an external electronic circuit imposes a severe limitation on the efficient utilization of battery-energy at high rates. At present, electrochemical reactions must be limited to relatively slow rates, in order to limit useless power dissipation within the battery. Compared to energy release in other chemical processes such as combustion or explosion, electrochemical reactions previously could not proceed rapidly without appreciable waste. Now, however, the present invention permits carrying on electrochemical reactions at high rates with little if any dissipation of power in an undesirable manner. The method may be considered unorthodox, in that it is not the solution to internal cell polarization and power dissipation traditionally sought or expected by most research workers in the field, but it is a method of practical utility.

There are numerous advantages to this invention. A fundamental restriction on efficiency of electrochemical cells is removed by this invention which can benefit limitless battery applications. The chemoelectric heat cell can achieve up to 100% efficiency of power conversion, based on the ratio of power obtained to maximum power available in the cell. In this definition, power is the time rate of energy generation, and efficiency is related to maximum power, an essential point. In conventional cells feeding conventional electronic circuits, the maximum efficiency obtainable is 25%, for the case of equal battery and load resistances and no nonohmic elements in the circuit. Efficiencies in practical cases are almost always far less, because nonohmic overvoltage exists in nearly every battery. Its effect could easily reduce maximum efficiency to only a few percent, or to less than 1% in extreme cases. This gross inefficiency is generally overlooked in battery design theory because of the erroneous definition of power efficiency as the ratio of power delivered at the load to power generated in both load and generator. It can be seen that this definition does not take into account the power capability of the generator, and in fact, leads to the absurd condition that 100% power efficiency is obtained when energy is drawn from the source at an infinitesimally small rate (e.g., power is zero).

The advantages of this invention can be realized in any application in which heat generation is the primary function. It is not believed suitable for circuit functions in which low current, bias voltage, or high voltage are prime requisites.

In the simplest possible terms, heat can be generated at high rates with up to 100% power efficiency by electric conversion in my electrochemical cell, whereas presently used methods cannot exceed 25% efficiency.

As illustrated in FIG. 2, a cell, of the present invention, can be constructed in the form of a box having double walls; the outer wall 20, forming one electrode, and the inner wall 22 forming the other electrode, with a fluid or gaseous electrolyte 24 added therebetween, a suitable means for adding or removing electrolyte may be provided.

FIG. 3 shows a tubular bimetal cell having the outer tube 30 forming one electrode and an inner strip 32 forming the other electrode. This type of cell can readily be used as a radiator. A fluid electrolyte 34, liquid or gaseous, can be pumped into the tube to activate the device and later evacuated therefrom to shut off the cell reaction. The fuel cell shown in FIG. 4 can also be made to operate in a similar manner as the tubular bimetal enclosing an electrolyte, as in FIG. 3.

The fuel cell of FIG. 4 consists of a bimetal tube, one half forming a first electrode 40 and the other half forming a second electrode 42. An ion permeable membrane 44 divides the inner portion into two chambers; a fuel 46 fills the chamber formed by electrode 40 and membrane 44 whereas an oxidant 48 fills the chamber formed by electrode 42 and membrane 44. In this fuel cell, energy sources (such as $H_2$ as the fuel and oxygen, for example) could be transported to the heating site, in a manner such as steam or hot water is piped to a radiator, but without loss of heat energy. In this design, since the cell parts are not consumed, the generation of heat can be controlled in degree and duration by control of the fuels.

In this invention, the method of generating heat by electrical means from a chemical source of energy, provides a method of electrical power conversion which can approach 100% efficiency of power delivered with respect to maximum power available.

Obviously many modifications and variations of the present invention are possible in the light of the above teachings. It is therefore to be understood that within the scope of the appended claims the invention may be practiced otherwise than as specifically described.

What is claimed is:

1. A chemoelectric heat source for conversion of chemical energy to heat by electrochemical combustion within the device to be heated, comprising:

(a) a bimetal container having no external electrical terminals and requiring no external electrical circuitry being constructed of two different metals, portions of each metal being in abutment and in direct electrical contact with each other and a substantial portion of each metal being exposed to form a portion of the inner surface of the container, the two different metals which form said container being suitable as and forming electrochemical cell electrodes;

(b) a suitable electrolyte added to said container for activation thereof and thus form a self-contained heating unit, the electrochemical reaction created within the unit by action of the electrolyte causing an ionic current to flow through the electrolyte from one electrode metal to the other electrode metal and complete the electric circuit through said two different metals in contact with each other, heat being generated by conversion of chemical energy to heat at a high rate entirely within said unit by passage of the current through the various resistances of said electrolyte and two different container metals.

2. A chemoelectric heat source as in claim 1, wherein substantially equal portions of each of the two metals are exposed to form the inner surface of said container.

3. A chemoelectric heat source for conversion of chemical energy to heat by electrochemical combustion within the device to be heated, comprising:

(a) a bimetal container having no external electrical terminals and requiring no external electrical circuitry being constructed of two different metals which are suitable as and form electrochemical cell electrodes, said two metals being in abutment and in direct electrical contact with each other and a substantial portion of each metal being exposed to form a portion of the inner surface of said container;

(b) a suitable electrolyte being added to said bimetal container for activation thereof and thus form a self-contained heating unit, and the electrochemical reaction thereby created within the unit by action of the electrolyte causing an ionic current to flow from one metal through the electrolyte to the other metal and complete the electric circuit where said two metals are in direct contact with each other and in absence of any external electrical circuit;

(c) the activation of this device being controlled by controlling the supply of electrolyte to said bimetal container, the electrolyte being removable to stop the reaction, heat being generated by conversion of chemical energy to heat at a high rate entirely within said unit by passage of said ionic current through the various resistances of the electrolyte and two different container metals when electrolyte is supplied to the container and halted when the electrolyte is removed therefrom.

4. A chemoelectric heat source as in claim 3 wherein said container is of tubular shape and of any desired length for coiling and the like into a radiator to be used for heating purposes.

5. A chemoelectric heat source as in claim 3 wherein said container has an ion permeable membrane separating the portion of said container in which one type of metal forms the exposed inner surface thereof from the other portion of the container in which the other metal forms the exposed inner surface thereof, and said electrolyte consists of a suitable fuel supplied to the container on one side of said membrane and an oxidant supplied to the container on the other side of said membrane.

6. A device as in claim 5 wherein said container is tubular in shape and may be of any desired length suitable for forming radiators for heat purposes.

7. A device as in claim 3 wherein said electrolyte may be liquid or gaseous.

8. A device as in claim 3 wherein said electrolyte may be transported to said container at a heating site by means much as hot water and steam are piped to a raditor.

9. A device as in claim 3 wherein said electrolyte is in a gaseous form for permitting more rapid evacuation thereof to halt the electrochemical reaction.

References Cited by the Examiner
UNITED STATES PATENTS

| 2,938,066 | 5/60 | Weigand | 136—161 |
| 2,970,180 | 1/61 | Urry | 136—90 |

FREDERICK L. MATTESON, Jr., *Primary Examiner.*

MURRAY TILLMAN, *Examiner.*